United States Patent Office 3,400,173
Patented Sept. 3, 1968

3,400,173
URETHANE POLYMERS CONTAINING GRAFT COPOLYMER OF VINYL CHLORIDE OR SAPONIFIED ETHYLENE-VINYL ESTER COPOLYMER
Artur Reischl, Leverkusen, Dietrich Hardt, Bonn, Bruno Zorn, Cologne-Flittard, Herbert Bartl, Cologne-Stammheim, and Wolfgang Speicher, Leverkusen, Germany, assignors to Farbenfabriken Bayer Aktiengesellschaft, Leverkusen, Germany, a corporation of Germany
No Drawing. Filed Dec. 13, 1965, Ser. No. 513,531
Claims priority, application Germany, Dec. 12, 1964, F 44,689
8 Claims. (Cl. 260—859)

ABSTRACT OF THE DISCLOSURE

Polyurethane articles including coatings, sheets, and leather substitutes are prepared from (a) a polyaddition product of an organic compound containing active hydrogen atoms that are reactive with NCO groups and having a molecular weight of from about 600 to about 10,000 and an organic polyisocyanate, the polyaddition product being substantially free of NCO groups; (b) from about 1 to about 200% by weight based on the polyaddition product (a) of a polyisocyanate having a molecular weight up to 20,000 and (c) a graft copolymer of (i) from about 10 to about 70% by weight of an ethylene-vinyl ester copolymer, said ethylene-vinyl ester copolymer having from about 25 to about 75% vinyl ester units, said ethylene-vinyl ester copolymer being saponified to an extent of from about 10 to about 70% by weight, and (ii) from about 30 to about 90% by weight of a vinyl monomer, at least 60% of which is selected from the group consisting of vinyl chloride, vinylidene chloride, and mixtures thereof.

---

This invention relates to polyurethane plastics and to a method of preparation. More particularly, it relates to shaped polyurethane articles, including coatings and sheets and leather substitutes.

The production of polyurethanes from high molecular weight polyhydroxy compounds, polyisocyanates and if desired, chain lengthening agents is already known. Mixtures of suitable polyurethanes used for example, as migration resistant plasticizers with vinyl polymers have also been prepared. The mixtures have technologically improved properties without the existence of a chemical link between the polyurethane and polymer.

It is an object of this invention to provide improved polyurethane plastics. It is another object to provide uniform synthetic resins having useful properties which render them versatile in use. It is another object of this invention to provide improved leather-like polyurethanes.

The foregoing objects and others which will become apparent from the following description are accomplished in accordance with the invention generally speaking by providing polyurethane plastics prepared from (a) a polyaddition product of a polymeric compound containing amino- and/or hydroxyl groups and having a molecular weight of from about 600 to about 10,000, an organic polyisocyanate and if desired chain lengthening agents having active hydrogen atoms that are reactive with NCO groups and having a molecular weight below about 600;

(b) from about 1 to about 200 percent by weight, based on the polyaddition product, of a polyisocyanate having a molecular weight of up to 20,000; and (c) a graft copolymer of a partially saponified ethylene-vinyl ester copolymer and a vinyl compound which consists of 10 to 70 percent by weight of an ethylene-vinyl ester copolymer which originally contains 25 to 75 percent of vinyl ester and is saponified to an extent of 10 to 80 percent by weight, and 30 to 90 percent by weight of vinyl graft polymer. If desired, up to 90 equivalents percent based on (b) of a fourth component (d) which is reactive with NCO groups can be incorporated.

The term "uniform synthetic resins" as used herein means high molecular weight polyaddition products and vinyl polymers which are linked through their main valency bonds.

If the above mentioned graft copolymers are merely reacted with the usual polyisocyanates, cross-linked products are obtained but these are frequently brittle and have insufficient structural strength and elasticity for some purposes.

A significant modification and improvement in properties is achieved during the cross-linking of the graft copolymers only if at the same time high molecular weight, rubbery elastic isocyanate polyaddition compounds are present and act in substance or in solution to form a uniform synthetic resin which is cross-linked over long segments. The isocyanate polyaddition compounds may also, even if only in subordinate quantities, contain functional groups such as NCO, OH or $NH_2$.

To build up these isocyanate polyaddition compounds (i.e., polyaddition product (a)) there are used organic compounds containing hydrogen atoms that are reactive with NCO groups and having a molecular weight of from 600 to 10,000 and preferably 1000 to 3000 such as polyesters, polyalkylene ethers, polythioethers, polyacetals, polycarbonates, polyamides and the like, containing hydroxyl and/or amino groups, may be used. These may, if desired, undergo a preliminary chmain lengthening reaction with diisocyanates to form a so-called prepolymer, or be prelengthened by condensation reactions, prior to the actual production of the high molecular weight isocyanate addition compounds, and they may contain other groups such as urethane, N-alkylurethane or amide groups. Especially suitable are polymerized mixed esters obtained from a dicarboxylic acid or a mixture of dicarboxylic acids and more than one glycol or polythioethers such as thiodiglycol or neopentyl glycol.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the oplycarboxylic acid to form a polyester such as, for example, ethylene glycol, propylene glycol, butylene glycol, neopentyl glycol, amylene glycol, hexanediol, bis-(hydroxy methyl-cyclohexane) and the like. Of course, the hydroxyl polyester may contain urethane groups, urea groups, amide groups, chalkogen groups and the like. Thus, the hydroxylterminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl-propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the Encyclopedia of Chemical Technology, volume 7, pp. 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

The inclusion of chain lengthening agents having a molecular weight below 600 is generally advantageous. Any suitable chain extending agent may be used such as, for example, N-methyl-bis [β-hydroxy-ethyl]-amine, water or thiodiglycol, ethylene glycol, propylene glycol, butylene glycol, 1,4-butanedio, butenediol, butynediol, xylylene glycol, amylene glycol, neopentyl glycol, 2,3-butanediol, 1,4-phenylene-bis-(β-hydroxy ethyl ether), 1,3-phenylene-bis-(β-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenylmethane and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as for example, N,N'-dimethyl hydrazine, 1,6-hexamethylene-bis-hydrazine, carbodihydrazine, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-capronic acid dihydrazide, gamma-hydroxy butyric hydrazide, bis-semicarbazide, bis-hydrazine carbonic esters of glycols such as many of the glycols heretofore mentioned and the like. Alcohols containing more than two —OH groups may also be included in small quantities. Organophosphorous compounds having reactive hydrogen atoms, for example, alkoxylated phosphoric acids, may also be used.

It appears to be especially important that in the process according to the invention, the isocyanate polyaddition compounds should be of as high a molecular weight as possible and at least somewhat cross-linked. These conditions may easily be fulfilled, for example, by ensuring that the ratio of NCO groups to hydroxyl and amino groups is greater than 1 during the reaction, i.e., an excess of polyisocyanate is employed or, if smaller quantities of polyisocyanates are employed, the reaction temperature should be increased accordingly to produce a cross-linking side reaction. The degree of cross-linking can also be influenced by using small amounts of tri- and tetra-functional reaction components.

The preparation of isocyanate polyaddition compounds is carried out by the known one-step or two-step process at temperatures up to about 200° C. in the melt, or possibly starting from a prepolymer stage, in solution, if desired with inclusion of catalysts.

Apart from the diisocyanates already mentioned as examples of polyisocyanate (b) used for linking the polyaddition product (a) to the graft copolymer (c), the following are examples of higher valency isocyanates which are preferentially employed: triphenylmethane-4,4',4''-triisocyanate, tri-[4-isocyanatephenyl]-thiophosphoric acid ester and also phosgenation products of commercially obtained aniline formaldehyde condensates or biuret, urethane or isocyanurate-polyisocyanates. The polyisocyanate can also be an NCO terminated reaction product of any of the isocyanates mentioned and an active hydrogen compound mentioned.

If it is desired to employ as component (d) other compounds reactive with isocyanates, compounds especially to be considered for this purpose are those having hydroxyl and/or amino groups as well as those having epoxy groups. The molecular weight should be below 10,000, preferably below 1000. Any of the chain extenders mentioned above are suitable.

The advantage of also allowing other compounds to react with the reactive hydrogen atoms is to be seen in the fact that it is thereby possible to produce modification in easily graded steps provided the other components (a), (b) and (c) are kept constant. For example, it is possible in this way to vary the rubbery elastic character, the temperature resistance and the resistance to chemicals of the products of the process.

The graft polymers (c) of vinyl chloride on partially saponified ethylene-vinyl ester copolymers, especially ethylene-vinyl acetate copolymers, are prepared by polymerizing vinyl chloride in the presence of partially saponified ethylene-vinyl ester copolymers. This can be effected for example, by the process of emulsion polymerization in which ethylene-vinyl ester copolymer latices are partially saponified by the customary methods and then further polymerized in emulsion after the addition of vinyl chloride. In the preferred process, however, the partially saponified ethylene-vinyl ester copolymer is dissolved, together with a monomer-soluble activator in vinyl chloride, and this solution is dispersed in water and polymerized by the method of suspension polymerization. A special advantage in this process is that all the components are simply added together in an autoclave, stirred for some time at room temperature to dissolve the copolymer in the vinyl chloride and the dispersion, and then polymerized. By this method, it is possible to prepare, disperse and polymerize even highly viscous solutions which would be very difficult to handle if prepared separately.

The graft polymers are composed of 10 to 70%, preferably 15 to 60% of an ethylene-vinyl copolymer which is saponified to the extent of 10 to 80% and originally contains 25 to 75% vinyl ester, and 30 to 90% of vinyl chloride polymer. The preparation of such polymers has been described, for example, in U.S. patent application No. 388,276.

In the preparation of the graft polymers, it is also possible to add minor quantities of other monomers, e.g., vinyl ester, $\alpha,\beta$-unsaturated mono- and/or dicarboxylic acids having 3 to 4 C-atoms and their derivatives such as hydroxyalkyl acrylates (-methyacrylates), maleic acid semiesters and others. These monomers or their mixtures with each other may amount up to 40% of the monomer mixture which is to be incorporated by grafting. The preparation of these graft polymers has been described, for example, in U.S. patent application No. 447,987, now Patent No. 3,355,516.

In general, the vinyl chloride in the reaction mixture for the graft polymerization can always be replaced by vinylidene chloride or vinyl chloride-vinylidene chloride mixtures, but this renders the products harder and more difficult to dissolve. If the graft polymerization is carried out at temperatures between 20 and 40° C. with initiators which decompose at relatively low temperatures, for example, percarbonates or acetyl cyclo hexane sulphonyl peroxide, the graft polymers obtained have a higher molecular weight and especially good mechanical properties.

The above described graft copolymers are obtained as finely dispersed powder or granules and are practically completely soluble although the solubility depends, of course, on the composition of the products and on the solvent employed. Products rich in vinyl chloride are generally soluble in tetrahydrofuran or cyclohexanone; as the content in saponified ethylene-vinyl acetate increases, esters and aliphatic ketones can also be used as solvents. These graft polymers can be prepared by the process of U.S. patent applications Ser. No. 388,276 and 447,987.

The reactants (a) to (d) may, for example, be reacted in bulk by homogenizing them with the aid of a ram kneading machine or on mixing rollers at temperatures of up to about 200° C., if desired together with fillers such as carbon black or silicic acid aerogel or pigments such as titanium dioxide. Polyisocyanates which have a very high vapor pressure, i.e., generally those having a molecular weight above 300, are preferred on physiological grounds. If necessary, the usual polyvinyl chloride stabilizers for graft copolymers may be added. Shaping is carried out at elevated temperatures by the usual methods for thermoplastic materials such as press molding, extrusion, calendering or by melt rolling, transfer molding or injection molding processes. Under the conditions of shaping at temperatures of up to 200° C., the individual components react to form a uniform, cross-linked synthetic resin.

Working in inert solvents provides especially interesting possibilities of application, but is possible only if the high molecular weight isocyanate addition compounds are capable of microgel formation in very low boiling solvents in spite of the cross-linking that is usually advantageously present, and if they can be worked up practically like true solutions. No physical distinction is made in this context between microgels and other disperse systems and true solutions, the term "solution" being used to cover all these systems.

Homogeneous coatings can be obtained on any surfaces, for example, on natural leather or synthetic foam leather, textiles, articles of natural and synthetic rubber, paper and fleeces, for example, by applying highly viscous, approximately 20 to 30% "solutions" with doctor blades or by pouring or spraying "solutions" of low viscosity onto the surfaces. The boiling point of the solvent or of the solvent mixtures is adjusted to ensure good running for any thickness of layer. If the products of the invention are to be used merely as a finish, all that is necessary is to apply sufficient of a 3 to 15% "solution" to leave a layer of 3 to $15\mu$ on the surface after evaporation of the solvent at room temperature or slightly elevated temperatures. For example, for coating textiles, wood, metal or paper, layers above $200\mu$ in thickness may be applied. The polyisocyanates (b) are preferably employed in quantities up to 100% by weight based on the polyaddition product (a), and can be added to the "solutions" of (a) and (c) immediately before use or earlier if no reaction takes place under the conditions of storage, provided access of moisture is excluded during storage. The reaction is usually accelerated with catalysts.

To produce a fibrous microporous sheet structure permeable to water vapor, the "solutions" may be sprayed onto a foundation. A particular embodiment of the process of the invention consists in that the solution of components (a), (b) and if desired, (c) and (d) is sprayed onto a surface intermittently in a stream of gas of a temperature not more than 80° C. below the boiling point of the solvent, the solution being broken up by the stream of gas and 50 to 99% of the solvent evaporating before the solution encounters the surface to be sprayed, the coating thereby produced being fibrous, non-liquidizing and permeable to water vapor, and if desired, the solidified foil can be stripped from its foundation and bonded to a porous substrate by means of discontinuous layers of adhesive.

To obtain a uniform fibrous structure, the point at which the sprayed jet encounters the surface should be constantly changed. This can be achieved by keeping either the surface or the spray jet or both in motion during the process of spraying. The most suitable viscosity is 10 to 180 sec. (4 mm. discharge nozzle, Ford measuring cup at spray temperature) for the solution mixture which is ready for spraying. In numerous solutions and gels which can be used for this purpose, a gel formation takes place after several hours or days but this can be reversed by heating and stirring. The "solution" then remains thinly liquid for a considerable time after cooling. This applies especially to "solutions" which have a higher concentration than 10 to 15%.

When spraying the "solution mixture," the rate of application must be kept low so that the stream of gas will break up the outflowing "solution" into fibrous structures. This can be achieved particularly easily by supplying the liquid through a ring nozzle which is concentric to the annular stream of gas such that the ring nozzle for the gas encloses the other ring nozzle for the liquid.

The solvent should be so chosen that when the polymer encounters the surface to be sprayed, sufficient solvent has already evaporated so that the fibrous aggregates will no longer run together to any significant extent but only stick together.

The spray distance, i.e., the distance of the nozzle from the surface to be sprayed, depends on the gas pressure, i.e., the velocity of the emergent gas stream, the quantity of gas and the rate of supply of the solution. The spray distance should be increased with increasing gas velocity, increasing quantity of gas and increasing supply of solution because otherwise the sprayed "solution" can no longer lose the 50 to 99% of the solvent by evaporation which is necessary to enable it to form a fibrous aggregate. For the same reason, the spray distance should also be increased with decreasing temperatures of the stream of gas or the "solution" and with increasing boiling point of the solvent.

For a usual spray pressure of 2 to 3 atmospheres above atmospheric pressure, a ring nozzle of 1 to 3 mm. diameter and spray temperatures around room temperature, using solvents having a boiling point below 90° C., spray distances of about 10 to 40 cm., more particularly 10 to 30 cm. will be employed.

Apart from the above-mentioned factors, the solvent power or microgel formation of the solvent also appears to affect the spray conditions. The effect is such that the spray distance may be all the smaller and the boiling point of the solvent all the higher the more sparingly the solvent will dissolve the polyurethane or convert it into a sprayable gel since evaporation of the solvent during the spray process and hence fiber formation are thereby promoted.

To obtain a porous sheet of 0.1 to 0.5 mm. in thickness, 20 to 300 spray applications are usually necessary. One spray application is equivalent to the thickness applied by one spray jet passing once over a surface. If attempts are made to obtain the desired thickness with substantially fewer spray applications, the rate of supply of the solution becomes too high and the sheets obtained have diminished permeability to water vapor.

The coatings permeable to water vapor can be applied by direct spraying of the solution in the above-described manner onto porous foundations, especially leather, split leather, fleeces, thin foam plastic foils and textiles. After spraying, the coating is dried at room temperature or elevated temperatures until the solvent has almost or completely evaporated, and the reaction of the components of the mixture is then taken to completion (hardening out). This can be achieved by leaving the product for some time at room temperature or elevated temperatures but not higher than 10 to 20° C. below the softening point of the components of the mixture, preferably at 80 to 120° C. The reaction can be accelerated by adding to the spray solution the usual accelerators such as tertiary aliphatic and alicyclic amines or organic metallic compounds such as tin-II-octoate or, especially advantageously dibutyl tin-IV-dilaurate.

The surface of the coated material can be ground smooth or treated to alter its appearance and handle, for example, colored or pigmented polymer solutions or dispersions, such as the polyacrylates and/or casein preparations used for dressing leather may be painted on the surface or applied with doctor blades or by spraying.

To obtain a good surface finish, it is especially advantageous to apply the sheets to the porous foundation by the so-called reversal process. In this process, the solution which is ready for spraying is first sprayed onto a matrix which serves as a foundation as described below. The matrix may be of steel, transfer paper, silicone rubber or other material from which the sheet which is applied by spraying, can subsequently be detached without damage. The surface of the matrix may carry the negative of a pattern such as a leather grain. After spraying, the solution is dried and hardened as described for the direct process. The sheet can then be removed from the matrix. On the side which was orginally in contact with the matrix, it will now carry the positive of the pattern on the surface of the matrix. This sheet can then be applied with adhesive to a porous foundation. To preserve the porosity and the permeability to water vapor, the adhesive should be applied as a discontinuous, raster-type layer, for example, by rolling, by application with a coating knife or by spraying.

It is particularly easy to apply the adhesive to the back surface of the sheet while it is still on the matrix. The porous substrate is then stuck to the sheet and the two layers are then together removed from the matrix. The advange of this method is that if adhesifying agents which harden are employed, the hardening can take place simultaneously with that of the sheet if adhesion takes place immediately after drying of the sheet on the matrix. It is usually deleterious to strip the sheets from the matrix before hardening is completed because the sheet may then suffer deformations during hardening.

If the direct process is employed, it may be advantageous to apply an adhesifying agent onto the substance to be coated before the solution mixture is sprayed.

In one particular method of carrying out the process, the polyaddition product (a) which may, for example, be dissolved in ethyl acetate, methyl ethyl ketone or tetrahydrofuran may itself serve as adhesifying agent. As a rule, however, one of the usual commercial adhesives, for example, those base on isocyanate or on butadiene-acrylonitrile copolymers or polychlorobutadiene will be employed.

A porous sheet-like structure, for example, a knitted fabric, textile material or fleece may also advantageously be placed between two porous sheet-like structures of the polyurethanes according to the invention. Products which have the softness of textiles and resemble nappa leather and similar products with high permeability to water vapor and a pleasant handle are obtained.

PREPARATION OF POLYADDITION PRODUCT (A)

Method A (prepolymer process) (Table I).—The given quantities of the high molecular weight polyhdroxy compounds are treated at the given temperatures with the given diisocyanates and stirred for 10 minutes. The chain lengthening agent is then left to act on these components in the same temperature region and the clear reaction melt is poured into molds. If necessary, the product is after-heated at 100 to 110° and when cool, the isocyanate polyaddition product is granulated and brought into "solution."

Method B (one-shot process) (Table I).—A mixture of the higher molecular weight polyhydroxy compounds and chain lengthening agents heated to the given temperature is intimately mixed with the quantity of polyisocyanate provided. The reaction temperature rises to the given value. If necessary, the product is after-heated as in Method A. Using the above-mentioned method, the comminuted material is converted into a microgel.

Chain lengthening reaction (Table I).—(1) The polyaddition product characterized under VI, containing 1.48 percent by weight of free isocyanate groups, is "dissolved" in tetrahydrofuran under reflux. 250 parts by weight of a 20% solution prepared in this way is introduced gradually at boiling temperatures into a solution of 1.5 parts by weight of piperazine hydrate in 250 parts by weight of tetrahydrofuran and boiled for a further 3 hours under reflux.

Analysis of the addition product indicates an NH content of 0.23%.

(2) 200 parts by weight of a 15% tetrahydrofuran solution of polyaddition product VII (NCO content 0.86%) are reacted as under 1 but with 0.38 parts by weight of 3,3'-dichloro-4,4'-diamino-diphenylmethane in 7 parts by weight of tetrahydrofuran.

TABLE I

| Polyaddition product (a) | Higher molecular weight polyhydroxy compound (parts by weight) | Diisocyanate (parts by weight) | Chain lengthening agent (parts by weight) | Addition reaction Method | Addition reaction Temperature, °C. | After heating at 100° (hours) | NCO/OH ratio | NCO content, percent |
|---|---|---|---|---|---|---|---|---|
| I | 91.8 PE 1 | 8.2 H | | B | 120–160 | 3 | 1.04 | |
| II | 84.4 PE 1 | 13.2 H | 2.4 B | B | 80–130 | 2 | 1.04 | |
| III | 46.8 PE 2<br>46.8 PE 3 | 7.3 T | 0.1 TMP | B | 140–170 | 5 | 0.89 | |
| IV | 71.0 PE 1<br>3.0 SI | 22.0 DM | 4.0 B | A | 90–120 | 2 | 1.04 | |
| V | 73.0 PE 1 | 22.7 DM | 4.3 B | B | 90–120 | 2 | 1.04 | |
| VI | 69.5 PE 1 | 25.6 DM | 4.9 B | A | 90–120 | | 1.20 | [1] 1.48 |
| VII | 68.2 PE 1 | 25.9 DM | 5.9 B | A | 90–120 | 1 | 1.05 | [1] 0.86 |
| VIII | 68.0 PE 1 | 26.4 DM | 5.8 B | B | 100–130 | 1 | 1.05 | |
| IX | 68.8 PE 4 | 26.1 DM | 5.1 B | A | 90–110 | | 1.15 | 0.56 |
| X | 69.7 PE 1 | 26.1 DM | 4.2 B | A | 90–140 | | 1.30 | 0.50 |
| XI | 66.7 PE 1 | 26.8 DM | 6.5 B | B | 120–160 | 4 | 0.99 | |
| XII | 55.8 PE 1 | 35.0 DM | 9.0 B | A | 70–90 | 2 | 1.10 | |
| XIII | 69.0 PAE | 24.7 DM | 6.3 B | B | 100–140 | 3 | 1.04 | |
| XIV | 69.5 PAEA | 25.1 DM | 5.4 B | B | 120–140 | 2 | 1.04 | |

[1] Continued reaction in solution (chain lengthening reaction).

EXPLANATIONS TO TABLE I

PE 1 Hexane-(1,6)-diol-2,2-dimethylpropane-(1,3)-diol-adipic acid polyester; OH number 54–61; acid number 2; molar ratio of glycols 22:12.

PE 2 Diethylene glycol-adipic acid polyester; OH number 56; acid number 1.

PE 3 Ethylene glycol-adipic acid polyester; OH number 56; acid number 1.

PE 4 Ethylene glycol-butylene glycol-(1,4)-adipic acid polyester; molar ratio of glycols 1:1; OH number 56; acid number 1.

PAE Polybutylene glycol ether; molecular weight 2750.

PAEA Polybutylene glycol ether-bis-[N,N'-methylurethane] containing amino end groups; (molecular weight 1900, preparation according to DAS 1,176,357 from polybutylene glycol-bis-[chlorocarbonic acid ester] and N-methyl ethanolamine).

SI organofunctional polysiloxane of the formula

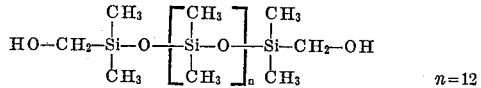

$n=12$

H Hexamethylene-1,6-diisocyanate
T Mixture of toluylene diisocyanate isomers, ratio of 2.4-:2,6-isomers=65:35
DM Diphenylmethane-4,4'-diisocyanate
B Butane-1,4-diol
TMP 1,1,1-trimethylol propane

PREPARATION OF GRAFT COPOLYMER (C)

A1.—4000 parts by weight of a copolymer of ethylene and vinyl acetate which originally contained 45% of vinyl acetate and has been saponified to the extent of 29%, 6000 parts of vinyl chloride, 20,000 parts of water, 60 parts of methyl cellulose and 4 parts of azodiisobutyric acid nitrile are charged into an autoclave equipped with stirrer. The mixture is vigorously stirred for 5 hours at room temperature and then heated at 60° for 15 minutes with continued rapid stirring.

After washing and drying, 8297 parts of a finely divided pearl polymer is obtained which is composed of 52% polyvinyl chloride polymer and 48% partially saponified ethylene vinyl acetate copolymer. The chlorine content is 29.1%, the OH content was determined and found to be 1.2%. K-value=63.5.

The polymer is completely soluble in tetrahydrofuran cyclohexanone and dioxane and forms clear, solid and elastic films after evaporation of the solvent.

A2.—If 12,000 parts of a 19% saponified ethylene-vinyl acetate copolymer originally containing 45% vinyl acetate and 8,000 parts of vinyl chloride in 20,000 parts of water are polymerized as under A1 with the addition of 120 parts of methyl cellulose and 5 parts of azodiisobutyric acid nitrile at 61 to 62°, a pearl polymer having a chlorine content of 42.1% and an OH content of 0.4% is obtained which is composed of 75% polyvinyl chloride polymer and 25% partially saponified graft substrate. The K-value determined in cyclohexanone is 67.

Yield: 83%. The product is soluble in tetrahydrofuran, cyclohexanone and dioxane and forms solid, clear, completely transparent films after evaporation of the solvent.

A3.—3000 parts of water, 650 parts of a 40% saponified copolymer of ethylene and vinyl acetate having an original vinyl acetate content of 66%, 850 parts of vinyl chloride, 30 parts of polyvinyl alcohol and 1.5 parts of azodiisobutyric acid nitrile are polymerized as under A1.

1100 parts of a finely dispersed graft polymer are obtained which is composed of 59% of partially saponified substrate and 41% of polyvinyl chloride polymer. The OH content is 3.7%. The polymer is readily soluble in tetrahydrofuran.

A4.—800 parts of a copolymer of ethylene and vinyl acetate which originally contained 30% of vinyl acetate and has been saponified to the extent of 20%, 2000 parts of water, 1200 parts of vinyl chloride, 40 parts of methyl cellulose and 1 part of azodiisobutyric acid nitrile are introduced into an autoclave equipped with stirrer. The mixture is stirred vigorously at room temperature and heated after 6 to 8 hours to 60 to 62° C. to initiate polymerization. After stirring vigorously at this temperature for 15 hours, polymerization is completed. 1597 parts of a finely dispersed pearl polymer are obtained which is composed of 50.1% of partially saponified graft substrate and 49.9% of grafted vinyl chloride polymer. The OH content is 0.55%. The polymer is clearly soluble in tetrahydrofuran.

A5.—1800 parts of vinyl chloride, 200 parts of a partially saponified copolymer of ethylene and vinyl acetate having an original vinyl acetate content of 66% and an OH content of 6.1% and a solution of 20 parts of methyl cellulose in 200 parts of water are introduced into an autoclave equipped with stirrer. After stirring vigorously for 5 hours at room temperature, a solution of 5 parts of acetyl cyclohexane sulphonylperoxide in 50 parts of methanol is introduced under pressure at +10° C. into the autoclave and the mixture stirred for 15 hours at 20° C. and 5 hours at 30° C. A graft copolymer is obtained in a finely dispersed form which is composed of 81% polyvinyl chloride polymer and 19% partially saponified substrate. The OH content is 3.0%, the K-value 83. The polymer is soluble e.g., in tetrahydrofuran or cyclohexanone.

A6.—A solution of 40 parts of methyl cellulose in 6000 parts of water, 800 parts of a partially saponified copolymer of ethylene and vinyl acetate originally having a vinyl acetate content of 66% and containing 6.1% free OH groups, and a mixture of 2200 parts of vinyl chloride, 100 parts of trichloroethylene, 200 parts of maleic acid propyl semi-ester and 100 parts of vinyl acetate and 6 parts of azo diisobutyric acid nitrile are introduced into an autoclave equipped with stirrer. The mixture is stirred for 7 hours at room temperature and the resulting dispersion is then polymerized at 62° C. for 15 hours. 2567 parts of a finely divided pearl polymer of K-value 50, 33.75% chlorine, 8.4% acetyl, 1.0% OH, acid number 3.0 are obtained.

A7.—As under A6, a mixture of 7200 parts of vinyl chloride, 300 parts of trichloroethylene, 300 parts of maleic acid propyl semi-ester and 150 parts of maleic acid dodecyl semi-ester is polymerized with 300 parts of azodiisobutyronitrile in the presence of 1800 parts of the ethylene-vinyl acetate copolymer described there, with the aid of a solution of 120 parts of methyl cellulose in 18,000 parts of water. The reaction temperature is 60° C., the reaction time 15 hours.

7355 parts of a finely dispersed polymer are obtained which is soluble in tetrahydrofuran and methyl ethyl ketone; 41.25% chlorine, 0.7% OH, K-value 50 and acid number 24.

In A1–A7, the vinyl chloride can be replaced by vinylidene chloride or vinyl chloride-vinylidene chloride mixtures but the vinylidene chloride content renders the products harder and more difficult to dissolve.

Process according to the invention (Examples 1–22 and experiment for comparison).

(1) Direct process.—A densely needled, ground and dust-free 1 mm. thick Perlon fleece made of 1 den. fibers and bound with polyurethanes in known manner, which has a surface area of 1000 cm.$^2$ and a weight per square metre of 700 g. is coated by the direct process as follows:

Three units (Kreuz) of an adhesifying agent are first applied to the ground, dust-free surface of the fleece by means of an ordinary commercial spray gun having a 2 mm. nozzle operating at 2 to 3 atmospheres above atmospheric pressure (temperature 24°). This adhesifying agent is composed of a solution of 10 parts of polyester polyurethane, 0.8 part of triisocyanate from 1 mol of trimethylolpropane and 3 mols of toluylene diisocyanate, 0.1 part of accelerator and 89.1 parts of ethyl acetate. Only sufficient solution is supplied to the spray jet to allow the adhesifying agent to be deposited in fine droplets or thin threads on the surface. The rate of application of the solution is adjusted by depressing to a greater or less extent the discharge stirrup of the spray gun. This stirrup is preferably depressed only to such an extent that the solution leaves in the form of a ring.

As soon as the adhesifying agent has been sprayed on to the fleece, 300 to 500 g. of a solution defined in table 2 are uniformly applied under the same conditions (2 mm. nozzle not quite open, spray pressure 2–3 atmospheres above atmospheric pressure, temperature 24° C.) which solution contains the components mentioned in the examples in the table and 0.2 to 0.8% by weight, based on polyaddition product A, of an accelerator in the given solvents. The solution is sprayed to produce a uniformly coated surface. About 50 to 150 spray applications of the solution are necessary, in other words, the solution is sprayed very "dry" i.e., the rate of flow of the solution is low compared to the flow of the gas stream; the spray distance is 25 to 30 cm. A major portion of the solvent originally present in the solution evaporates during spraying. This can be determined by weighing a sprayed sample immediately after application by spraying and after drying and calculating the result from the solvent content originally present.

The coated substrate is then dried for 2 hours at 50° C. in a circulating air drying cupboard and then heated to completion for 15 minutes at 100 to 105° C. The surface of the material is then finely and uniformly ground and equalized by spraying several Kreuz units of a conventional leather covering paint based on pigment, a polyacrylate dispersion and casein preparation on the surface.

The sheet thus obtained, when tested in a Bally flexometer shows the crease-resistance and permeability to water vapor indicated in Table II. In handle end appearance it resembles leather.

(2) Reversal Process.—A glossy, chromed steel plate of 1000 cm.$^2$ having a grain pattern is coated as follows:

A "solution" characterized in Table II is applied in 65 spray applications with a spray gun under the conditions described above at a spray pressure of 2 to 3 atmospheres above atmospheric pressure at 22° C. and a spray distance of 25 cm.

When spraying is completed, the sheet obtained is dried on the matrix for 10 minutes at 100° C. It is then left to cool. The surface of the sheet on the matrix is lightly ground to equalize it and then made free from dust. Four Kreuz units of a solution containing 7 percent of a polyester urethane, 1.5% triisocyanate from 1 mol of trimethylolpropane and 3 mols of toluylene diisocyanate and 0.05% of an accelerator are then sprayed onto the ground surface of the sheet and the ground, dust-free surface of a split leather to form a discontinuous layer of adhesive and this is left to air at room temperature for one minute. The sheet and the fleece or some other foundation are then placed together with their adhesive surfaces in contact, lightly pressed smooth and then compressed at 20 atmospheres above atmospheric pressure for half a minute at room temperature and then finally heated at 110° C. for 20 minutes. The material is left to cool and only then is the substrate with the sheet adhering to it stripped from the matrix.

The article obtained can be painted with a thin layer of the usual leather covering paints on the coated side. It has the appearance and handle of a full grain leather.

TABLE II.—EXPERIMENTAL EXAMPLES 1–22 AND COMPARISON EXAMPLE FOR THE PRODUCTION OF MICROPOROUS SHEET STRUCTURES BY THE SPRAY PROCESS

| Example | Polyaddition product (a) (parts by weight) | Graft copolymers (c) (parts by weight) | Polyisocyanate (b) (parts by weight) | Catalyst (parts by weight) | Additives (parts by weight) | Solvent Type | Solvent Concentration | Permeability to water vapor | Crease resistance without breakage |
|---|---|---|---|---|---|---|---|---|---|
| 1 | 67 II | 34 II | 15 N | Z | | THF | 15 | 3.0 | 180,000 |
| 2 | 50 V | 50 I | 10 N | Z | | THF | 10 | 6.0 | >200,000 |
| 3 | 67 V | 34 II | 20 N | Z | | THF | 15 | 3.6 | >200,000 |
| 4 | 67 V | 34 IV | 10 R | SO | | MAL | 10 | 3.1 | >200,000 |
| 5v | 67 V | 34 III | 15 R | Z | | ¹MGA+THF | 12 | 3.2 | 140,000 |
| 6 | 67 V | 34 II | 10 RF | Z | | THF | 20 | 2.3 | >200,000 |
| 7 | 67 V | 34 II | 10 L | | | THF | 10 | 5.2 | >200,000 |
| 8 | 67 V | 34 VI | 20 RF | Z | | THF | 10 | 2.6 | >200,000 |
| 9 | 67 V | 34 VI | 10 V | Z | | THF | 12 | 2.5 | 140,000 |
| 10 | 66 V | 34 II | 10 RF | Z | 10 F | THF | 10 | 6.4 | >200,000 |
| 11 | 75 V | 25 II | 20 N | Z | 20 F | THF | 10 | 4.0 | >200,000 |
| 12 | 66 V | 34 II | 10 N | Z | 5 DP | THF | 10 | 5.8 | >200,000 |
| Comparative test | | 100 II | 10 N | Z | | THF | 10 | 7.0 | 5,000 |
| 13 | 75 VI | 25 II | 10 RF | Z | | THF | 10 | 4.2 | >200,000 |
| 14 | 66 VII | 34 II | 10 N | Z | | THF | 12 | 10.0 | >200,000 |
| 15 | 66 VIII | 34 II | 10 RF | Z | | THF | 10 | 4.6 | >200,000 |
| 16 | 66 VIII | 34 II | 10 N | Z | | THF | 10 | 5.3 | >200,000 |
| 17 | 66 IX | 34 II | 10 RF | Z | | THF | 10 | 3.3 | >290,000 |
| 18 | 66 X | 34 II | 10 RF | Z | | THF | 10 | 2.5 | >200,000 |
| 19 | 80 XI | 20 II | 10 RF | Z | | THF | 10 | 5.3 | >200,000 |
| 20 | 66 XII | 34 II | 10 N | Z | | THF | 10 | 1.8 | >200,000 |
| 21 | 66 XIII | 34 II | 10 N | Z | | THF | 10 | 5.0 | >200,000 |
| 22 | 66 XIII | 34 II | 10 N | Z | | THF | 10 | 4.5 | >200,000 |
| 22a | 80 XIV | 20 II | 15 RF | Z | | THF | 10 | 5.0 | >200,000 |

¹ Ratio MGA:THF=25:75.

The two methods given above are intended to explain the principle of production of the vapor permeable covering layers. They can be used not only for leather and fleeces but also for coating all kinds of substrates such as textiles, paper and knitted fabrics. The sheet structures can also be produced by machine and continuously.

EXPLANATION OF TABLE II

N=Biuret triisocyanate from 3 mols hexamethylene diisocyanate and 1 mol water
R=triphenylmethane-4,4',4"-triisocyanate, added as a 20% methylene chlorine solution, quantity indicated is based on solid substance
RF=Tri-(4-isocyanatephenyl) - thiophosphoric acid ester added as 20% methylene chloride solution, quantity given based on solid substance
V=Phosgenation product from a commercial aniline formaldehyde condensate, NCO content 30.3%
L=addition product from 1,1,1-trimethylolpropane (1 mol) and 2,4-toluylene diisocyanate (3 mols) added as 75% ethyl acetate solution, quantity given based on solid substance
Z=dibutyl tin dilaurate
SO=tin-II-octoate
F=38% aqueous formaldehyde solution with 3 parts of trichloroacetic acid
DP=dibenzoyl peroxide
THF=tetrahydrofuran
MAK=methyl ethyl ketone
MGA=methyl glycol acetate
Permeability to water vapor, determined according to IVP 15 (mg./h.cm.$^2$), see "Das Leder" 12 (1961) pp. 86–89, Crease-resistance, Bally flexometer, see "Das Leder" 8 (1957) pp. 190–191.
>=more than the given number of bending splits without tears.

In the case of Examples 8 and 22, the direct process is employed, otherwise the reversal process.

With the exception of Examples 7 and 10, the foundation employed is a ground, dust-free, 1 mm. thick Perlon fleece bound in known manner, composed of 1 den. fiber and having a weight per m.$^2$ of 500 to 700 g. In Example 7, velvetone is employed and in Example 10 a split chrome leather.

In Table III are summarized the test results obtained on microporous (spray technique in tetrahydrofuran solution) and homogeneous (casting technique in tetrahydrofuran solution) sheet structures without foundation obtained according to Example 20.

After a storage time of about 24 hours, the coating is resistant to the methyl ethyl ketone solvent employed for solution. A high gloss, smooth, clear coating is obtained which is supple and has good adhesin and good resistance to petrol, chlorine hydrocarbons and other solvents.

Example 24

A polyamide fabric (weight/m.$^2$ 60 g.) is coated with the mixture described in Example 23. A total of 15 g./m.$^2$ of solid substance is applied in two passages, the substance being dried at 80° C. after each passage. After a reaction time of 10 minutes at 125° C., the coating is insoluble in methyl ethyl ketone and resistant to the solvents used in dry cleaning such as trichloroethylene or petrol.

A soft, flexible coating is obtained which is resistant to the hydraulic pressure of a water column of more than 2000 mm. (according to DIN 53886). After treatment in perchloroethylene for one hour at 25° C., the coated fabric still has a resistance to water of 1800 mm. The weight loss is 1.5 g./m.$^2$.

Example 25

A smooth cotton fabric of 120 g./m.$^2$ is coated with the following mixture by means of a floating knife: 1000 parts by weight of a 23% methyl ethyl ketone "solution" of equal parts of polyaddition product V and graft copolymer A2, 23 parts by weight of biuret triisocyanate according to Example 23 and 1.15 parts by weight of dibutyl tin-IV-dilaurate.

10 g./m.$^2$ of solid substance is applied and the coated fabric then dried and calendered as in Example 23. The fabric is coated in five further passages through a rubber blanket coater and dried at 80° C. each time. A firmly adhering coating of 120 g./m.$^2$ which has only a slight surface stickiness is obtained on the fabric. After a reaction time of about 24 hours, the coating is non-sticky and stable to methyl ethyl ketone. It has a pale yellow translucency and very matt surface. The handle of the coating is pleasantly soft.

Example 26

A chromed neat's leather which has been re-tanned and buffed in the usual manner has a primer coat of covering paint of the following composition applied with a brush or by pouring or with a plush pad: 100 parts of a conventional leather covering paint based on casein containing 40% iron oxide pigment, 400 parts of water, 150 parts of a conventional commercial aqueous dispersion of a mixed polymer of butadiene, acrylonitrile and styrene.

TABLE III

| | Thickness (mm.) | Tensile (kilogram wt.), abs. | Strength (kilogram, wt./cm.$^2$), rel. | Elongation at break (percent) | Thickness (mm.) | Tear resistance (IUP) | | Permeability to water vapor (IUP) (mg./h. cm.$^2$) |
|---|---|---|---|---|---|---|---|---|
| | | | | | | Kg. w. abs. | Kg. w./cm., rel. | |
| Film, microporous, 310 g./m.$^2$ | 0.35 | 3.05 | 87.45 | 150 | 0.35 | 0.110 | 3.1 | 8.67 |
| Film, microporous, 280 g./m.$^2$ | 0.29 | 2.55 | 88.00 | 143 | 0.34 | 0.105 | 3.1 | 6.52 |
| Film, microporous, 325 g./m.$^2$ | 0.25 | 5.85 | 228.00 | 330 | 0.18 | 0.100 | 5.5 | 0.19 |

Example 23

A smooth cotton fabric of 120 g. per m.$^2$ is coated with the following mixture by means of a floating coating knife: 1000 parts by weight of a 25% methyl ethyl ketone "solution" of equal parts polyaddition product I and graft copolymer A2, 32 parts by weight of biuret triisocyanate from 3 mols hexamethylene diisocyanate and 1 mol of water, 1.6 parts by weight of tin-II-octoate.

About 10 g./m.$^2$ of solid substance are applied and the coated fabric is then dried at 80° C. and smoothed with a pressure of about 2 tons between a steel and paper roller. The same process is repeated 12 times without further smoothing. The result is a fabric coated with a firmly adhering layer of synthetic resin weighing 125 g./m.$^2$ and having a total weight of about 245 g./m.$^2$.

The application of primer is smoothed hydraulically after drying. This is followed by the application by casting or spraying of about 100 to 200 g./m.$^2$ of the following mixture: 100 parts of polyaddition product IV in 10% solution in methyl ethyl ketone, 50 parts of graft copolymer A7 in 10% solution in methyl ethyl ketone, 100 parts of methyl glycol acetate, 100 parts of polyisocyanate L in 75% solution in ethyl acetate.

When this coat of lacquer has dried overnight, the resulting coating on the leather has a pleasant silky gloss, smooth handle and good fastness properties and adheres firmly to the above described primary and, in contrast to many other lacquers based on polyurethane, it also adheres firmly to mixed polymer primers based on acrylic acid esters. A similar lacquer composition which contains, instead of the graft copolymer of ethylene-vinyl acetate-maleic acid ester and vinyl chloride, an equal quantity of a conventional suspension polyvinyl chloride, is non-homogeneous and when applied to a primed leather it produces a stippled coating.

Example 27

A buffed chromed calf leather is primed with the following mixture applied by hand by means of a plush pad or brush or applied by spraying or casting: 100 parts of a commercial covering paint based on casein and containing 7 to 10% carbon black pigment, 600 parts of water, 200 parts of a commercial aqueous dispersion of a hydroxyl group-containing copolymer of butadiene, acrylonitrile and hydroxy propylmethacrylate (Belgian patent specification 651,848).

After it has been left to dry overnight at room temperature, this primer coating is smoothed hydraulically at 60° C.

The following mixture is then applied on the primed leather by spraying or casting: 100 parts of polyaddition product III in 45% solution in ethyl glycol acetate, 225 parts of graft copolymer A5 in 10% solution in tetrahydrofuran, 700 parts of ethyl acetate, 700 parts of methyl glycol acetate, 0.05 part of a phenyl methyl polysiloxane and 42 parts of polyisocyanate L in 75% solution in ethyl acetate.

The lacquer dries at room temperature to form a matt coating whose pleasant velvety matt effect is not impaired even by rough scrubbing. Owing to its good crease resistance and fastness to abrasion, this coated leather is suitable for use e.g., as shoe upper leather, upholstery leather, wallet leather and leather garments.

Example 28

A final coat of the following mixture is applied by roller or a coating knife to a polyvinyl chloride foil which has been plasticized with equal parts of phthalic acid ether: 100 parts of polyaddition product VIII in 10% solution in methyl ethyl ketone, 50 parts of graft copolymer A2 in 10% solution in methyl ethyl ketone, 1 part of a finely divided pyrogenic silicic acid, 260 parts of ethyl acetate and 10 parts of polyisocyanate L in 75% solution in ethyl acetate.

When this top coat is dry, a matt surface is obtained which improves the handle and the fastness to abrasion of the polyvinyl chloride foil.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. A method of preparing polyurethane plastics which comprises reacting
   (a) a polyaddition product of an organic compound containing active hydrogen atoms that are reactive with NCO groups and having a molecular weight of from about 600 to about 10,000 and an organic polyisocyanate, said polyaddition product being substantially free of NCO groups
   (b) from about 1 to about 200% by weight, based on the polyaddition product of a polyisocyanate having a molecular weight up to 20,000, and
   (c) a graft copolymer of (i) from about 10 to about 70% by weight of an ethylene-vinyl ester copolymer, said ethylene-vinyl ester copolymer having from about 25 to about 75% vinyl ester units, said ethylene-vinyl ester copolymer being saponified to an extent of from about 10 to about 70% by weight, and (ii) from about 30 to about 90% by weight of a vinyl monomer, at least 60% of which is selected from the group consisting of vinyl chloride, vinylidene chloride, and mixtures thereof.

2. The process of claim 1 wherein the components are mixed by a high torque shearing device at temperatures of up to 200° C. and then thermoplastically formed.

3. The process of claim 1 wherein that the components are dissolved in an organic solvent and applied to a surface.

4. The method of claim 3 wherein the solution of components (a), (b) and (c) is sprayed discontinuously in a stream of gas at a temperature less than 80° C. below the boiling point of said solvent onto a surface so that from 50 to 99% of the solution evaporates before reaching the surface to form non-melting, fibrous structures which are permeable to water vapor.

5. The polyurethane plastic prepared by the process of claim 1.

6. The process of claim 1 wherein up to 90 equivalent percent based on the organic polyisocyanate (b) of an organic compound containing active hydrogen atoms which are reactive with NCO is incorporated in the reaction.

7. The process of claim 1 wherein the polyaddition product (a) is prepared from an organic compound containing active hydrogen atoms selected from polyesters, polyethers, polyamides, polyacetals, polycarbonates and polythioethers.

8. Simulated leather prepared by the process of claim 4.

No references cited.

MURRAY TILLMAN, Primary Examiner.

P. LIEBERMAN, Assistant Examiner.